United States Patent
Phifer et al.

(10) Patent No.: US 7,147,779 B1
(45) Date of Patent: Dec. 12, 2006

(54) PASSIVE TREATMENT OF WASTEWATER AND CONTAMINATED GROUNDWATER

(75) Inventors: Mark A. Phifer, N. Augusta, SC (US); Frank C. Sappington, Dahlonega, GA (US); Margaret R. Millings, N. Augusta, SC (US); Charles E. Turick, Aiken, SC (US); Pamela C. McKinsey, Aiken, SC (US)

(73) Assignee: Westinghouse Savannah River Company, Aiken, SC (US)

( * ) Notice: Subject to any disclaimer, the term of this patent is extended or adjusted under 35 U.S.C. 154(b) by 0 days.

(21) Appl. No.: 11/288,713

(22) Filed: Nov. 29, 2005

(51) Int. Cl.
*C02F 3/00* (2006.01)

(52) U.S. Cl. ........................ 210/610; 210/611

(58) Field of Classification Search ............. 210/610, 210/611
See application file for complete search history.

(56) References Cited

U.S. PATENT DOCUMENTS

| | | | |
|---|---|---|---|
| 5,076,927 A | | 12/1991 | Hunter |
| 5,265,674 A | * | 11/1993 | Fredrickson et al. ........ 166/246 |
| 5,458,747 A | * | 10/1995 | Marks et al. ............... 205/702 |
| 5,514,279 A | | 5/1996 | Blowes et al. |
| 5,772,887 A | | 6/1998 | Noah et al. |
| 5,833,855 A | | 11/1998 | Saunders |
| 5,922,204 A | | 7/1999 | Hunter et al. |
| 6,331,300 B1 | * | 12/2001 | Dybas et al. ............... 424/93.4 |
| 6,398,960 B1 | * | 6/2002 | Borden et al. .............. 210/610 |
| 6,589,776 B1 | * | 7/2003 | Harkness ................. 435/262.5 |
| 7,045,339 B1 | * | 5/2006 | Sorenson et al. ........ 435/262.5 |

OTHER PUBLICATIONS

Phifer et al., *D-Area Sulfate Reduction DIW-1 Organic Applicaiton Field Study*, WSRC-TR-2003-00486, Aiken SC 2003.

* cited by examiner

*Primary Examiner*—Chester T. Barry
(74) *Attorney, Agent, or Firm*—J O'Toole; Nexsen Pruet, LLC

(57) ABSTRACT

A bioremediation system using inorganic oxide-reducing microbial consortia for the treatment of, inter alia coal mine and coal yard runoff uses a containment vessel for contaminated water and a second, floating phase for nutrients. Biodegradable oils are preferred nutrients.

15 Claims, 2 Drawing Sheets

PASSIVE TREATMENT OF WASTEWATER AND CONTAMINATED GROUNDWATER

STATEMENT OF GOVERNMENT RIGHTS

The United States Government has rights in this invention pursuant to Contract Number DE-AC09-96-SR18500 between the U.S. Department of Energy and Westinghouse Savannah River Company

BACKGROUND OF THE INVENTION

1. Field of the Invention

This invention relates to improved methods for the long-term treatment of wastewater and contaminated groundwater, especially contaminated groundwater from persistent sources, using self-regulating bacterial treatment requiring minimal maintenance.

2. Background and Prior Art

Persistent contamination of wastewater and groundwater presents an ongoing problem because any treatment method must be established and maintained for extended time-periods when compared to sites no longer producing contaminants. Abandoned mines leak acids and acid soluble minerals continuously and effective closure is cost prohibitive. Coal yards/piles at operating coal fired power plants are a significant point source for contamination and the leakage is expected to be continuous until the power plant is closed. Active pump and treat technologies require resources such as power, treatment chemicals and personnel. These costs cannot be incorporated into product pricing under any economically sound scenario.

On site and in situ bioremediation schemes offer promise of lower cost and acceptable thoroughness but systems attempted to date have not found general acceptance. Examples of such treatment methods may be found in U.S. Pat. No. 5,076,927 to Hunter; U.S. Pat. No. 5,514,279 to Blowes, U.S. Pat. No. 5,772,887 to Noah et al.; U.S. Pat. No. 5,833,855 to Saunders; U.S. Pat. No. 5,922,204 to Hunter; and U.S. Pat. No. 6,398,960 to Borden. A survey of technologies particularly adapted to mine drainage is *Handbook of Technologies for Avoidance and Remediation of Acid Mine Drainage*, Skousen et al. eds., National Mine Land Reclamation Ctr., Morgantown, 1988.

The technologies proposed in the above-identified references are difficult to regulate on an on-going basis due to outflow seepage, plugging, and difficulty in regulating the operational rate of the treatment method. The need exists, therefore, for a treatment system which is stable, effective for the contaminants to be treated, does not require frequent attention, easily replenished and easily cleaned of solid debris. It is particularly desirable that the system has little or no power requirement and that once established will be operable for multiple years if not indefinitely.

BRIEF SUMMARY OF THE INVENTION

We have developed a bioremediation method and apparatus which is specific for the contaminants to be treated, is long lasting, requires infrequent attention, is stable and requires irregular addition of inexpensive, readily available, easy to handle biochemical energy sources.

A treatment zone is established by creating a void area in or above ground, depending on water source. The zone has sides, top and bottom, an inlet for water to be treated, an outlet for treated water, and at least one inlet by which a nutritive substrate can be added. Using endogenous bacteria from the contaminated site, selected bacteria from a similar site, or organisms cultured in a laboratory, a community of naturally selected bacteria is established within the treatment zone.

The bacteria are a mixture of species from the same or related genera and are facultative or obligate anaerobes selected in situ or ex situ for reaction/reduction of the contaminants present. The bacteria have in common that they require electron donors in their culture media. Of this consortium, the bacteria responsible for contaminant removal have in common the requirement of a terminal electron acceptor (TEA) that allows for respiratory growth under anaerobic conditions. TEAs will be redox active inorganic oxides or chlorinated organics. Contaminant removal will occur by either direct reduction, when that particular contaminant is chemically reduced by bacteria or by indirect reduction when a reactive end-product of anaerobic respiration [i.e. $H_2S$ or $Fe(II)$] reacts chemically with a contaminant to produce an insoluble mineral.

The electron donor/nutrient for the bacteria are biodegradable oils and waxes. The biodegradable oils are relatively inexpensive. High purity is not required. The oils float as a separate phase on the water being treated and degrade slowly to provide a steady nutritional source for the bacteria.

DETAILED DESCRIPTION OF THE INVENTION

Figure 1:
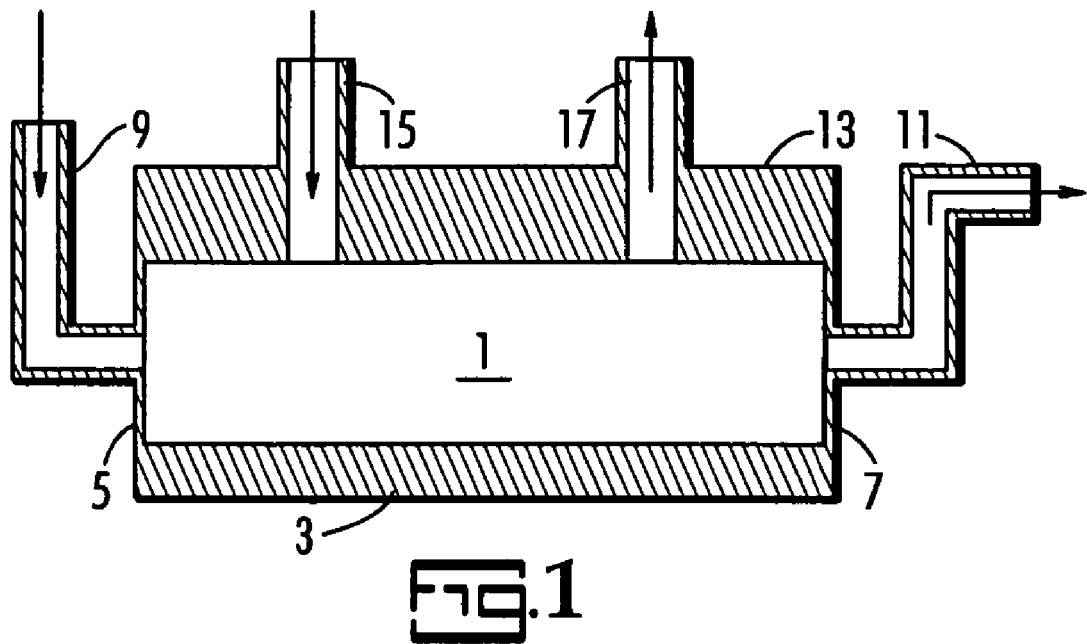
FIG. 1 is a schematic of a generic treatment system.

The invention is a method of bioremediation characterized by treatment means that prevents migration of bacteria and nutrients away from the treatment zone, concentrates precipitated and accumulated solids in a collection zone to limit clogging of the system and which is stable over extended periods of time.

It has been reported in the patents listed supra and in other documents that indigenous bacteria, typically of multiple species and sometimes of different genera become selected in the presence of contaminants and become effective treatment agents for a time. Maintaining viable in situ treatment zones is difficult because different flow rates on the surface and in the vadose zone induce migration in an uncontained treatment zone. Treatment zones that have restrained movement tend to become plugged with solids including precipitates of some metals and decomposed organic matter including cellular debris.

Anaerobic bacteria are useful in bioreactors of this type, and require a source of nutrients, especially electron donors. Lactates, organic waste products such as mulch, pine needles and decaying leaves have been reported as sources (Borden et al., U.S. Pat. No. 6,398,960 reports injection with emulsified vegetable oils, molasses or leachate into the ground).

Sulfate reducing bacteria (SRB) are obligate anaerobes which survive exposure to oxygen, presumably in a resting state, until a suitable environment is established by a mixed microbial community. SRB's reduce sulfate to sulfide, generating $H_2S$. The sulfates are electron acceptors and SRB's require electron donors to function. SRB's function well at pH values greater than 5.5, 6.6 being reported optimal for some species. We have found isolated activity in solutions as acidic as pH2. [Tuttle, J. H., P. R. Dugan and C. I. Randles. 1969. Microbial Sulfate Reduction and its Potential Utility as an Acid Mine Water Pollution Abatement Procedure. *Applied Microbiology*. 17:297–302.] SRB-mediated sulfate reduction is expressed by the simplified equation:

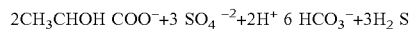

In the presence of $H_2$ S, divalent metals are precipitated as their sulfides. Production of carbonate gradually raises the pH to preferred levels even though protons are generated in the precipitation reactions In addition to an electron donor such as a fatty acid, trace amounts of phosphate and nitrogen are required. The sulfate reducers may be considered as indirect reducers because they produce H2S which in turn precipitates a metal or actinide abiotically as the sulfide.

A second group of bacteria are indirectly acting because by raising pH or increasing the CO2 concentration they cause precipitation through changing the solubility of the metal in the less favorable conditions (e.g., precipitate as the hydroxide or carbonate). Al, which is toxic to many bacterial species, is removed in this way, as are chromates.

We have found that a stable nutrient/electron donor source is a vegetable oil floated upon the layer of contaminated water. Unlike needles and leaves, no solids are introduced which can plug the outlet from the treatment zone. Unlike emulsified oils and water soluble nutrients, the floated oil does not flow out of the zone with the treated water.

The nutrient oils useful in this invention are not particularly limited. Any natural organic compound with negligible water solubility (e.g. <5%) and a specific gravity less than 0.99 is suitable. Preferred are "vegetable oils," including canola oil, rapeseed oil, coconut oil, corn oil, cottonseed oil, olive oil, palm oil, palm kernel oil, peanut oil, safflower oil, soybean oil or sunflower oil, oils of animal origin such as beef oil and cod-liver oil and waxes such as tallow, candelilla oil, carnawba wax, beeswax, cotton wax, palm tree wax. Purity is not critical and mixtures are suitable. All of the oils and waxes can be saponified by various indigenous organisms including some SRB's to produce fatty acids of decreasing chain lengths when metabolized by a variety of indigenous organisms, typically fermentative bacteria. The shorter chain fatty acids are the requisite electron donors to support the SRB's. Mineral oil may be used but is less preferred.

The treatment zone may be above or below ground, depending on the hydrology and topography of the area. Above ground treatment zones and below ground zones may be formed from water barrier materials such as concrete, FRP, metal, or HDPE. Excavations may have stabilized sides and be lined with butyl rubber. Above ground or partially buried treatment zones require a roof, preferably a floating roof. Below ground location is preferred in colder climates.

Water may be directed to an inlet into the treatment zone by a funnel and gate system, GeoSiphon™ or GeoFlow™, flumes, sluice boxes, channels, troagls, perforated or solid pipes, bergs and trenches.

Within the treatment zone microbial growth rates are controlled by the concentration of limiting nutrients (i.e. carbon sources). Nutrients are converted to microbial biomass and also provide energy for microbes to transform contaminants. In flow-through systems growth is a function of the rate of nutrient addition. Another factor that controls nutrient concentration is the flow rate of water through the system. In this case the dilution factor (D) is proportional to the flow rate (F) divided by the aqueous volume (V) in a system:

$$D=F/V \quad (1)$$

For slow moving water D is slightly greater than 0. As the flow increases in a system, D approaches 1. Essentially D is a measure of mean residence time of nutrients in a bioreactor or a subsurface reactive zone.

In environmental systems the flow rate at any given site can vary due to changes in water input into the system. In order for microbial growth to occur at near optimal rates, the nutrient concentration, (s), must match D. In addition, the rate of the depletion of nutrients is a function of microbial growth rate and microbial density. So for microbial growth to continue at optimum rates, nutrient concentrations must be controlled relative to these variables.

When growth rates are balanced between flow and nutrient conditions, steady state growth is reached. This can be explained as follows:

The rate of change of growth limiting substrate (s) is equal to the input rate of fresh substrate ($DS_R$), minus the rate of substrate removal out of the system ($D_s$), minus the rate of substrate removal by microbes ($\mu x/Y$). Where $\mu$ is the microbial growth rate, x is microbial mass and Y is the microbial energy required to maintain physiological functions of the cell, excluding growth. This can be written as follows:

$$ds/dt=(DS_R-D_s)-(\mu x/Y) \quad (2)$$

Steady state conditions are established when growth, dilution rate and nutrient additions are balanced, in other words when ds/dt=0.

At steady state conditions, when the microbial growth approaches maximum ($\mu_{max}$), the system is operating very efficiently, both physiologically as well as economically from the point of view of bioremediation. In order to maintain near optimum conditions nutrient concentrations need to vary as changes in microbial concentration, flow rate, and changes in microbial growth rates due to their physiological state (i.e. temperature changes, stage of growth, or potential contact by inhibitory compounds). Microbial activity under specific conditions can be defined with the term $K_s$, which is a measure of the nutrient requirement to achieve one half of $\mu_{max}$. Therefore, steady state conditions can be written as:

$$D=(\mu_{max}.\hat{s})/(K_s+\hat{s}) \quad (3)$$

and as:

$$\hat{s}=(DK_s)/(\mu_{max}-D) \quad (4)$$

where $\hat{s}$ is the steady state growth-limiting substrate concentration and it is assumed that $\hat{s}>K_s$. Thus steady state can be determined and maintained when the above conditions are known. For use in remote settings in the environment it is impractical to monitor all necessary variables to achieve steady state microbial growth and performance.

The invention described here uses the low solubility of non-aqueous biodegradable organics to regulate nutrient concentrations to microbes as variables change over time. As the organics are utilized for microbial growth under varying conditions and ŝ changes (equations 3 and 4), the amount of organics that dissolve from the non-aqueous bulk phase will also vary as a function of ŝ to approach $\mu_{max}$ (equation 4). Because the organics described here are low in solubility and lighter than water, they will remain in place longer without removal from the system as a function of flow rate. Thus nutrient loss in the system is not affected by D (equation 1). Consequently equation 4 can be simplified to:

$$\hat{s} = (K_s)/\mu_{max} \quad (5)$$

In addition, as organics are utilized from the aqueous phase for microbial growth, the organic concentration (ŝ) in contact with microbes for growth will remain a function of Ks for any given growth condition (i.e. temperature). Growth rates are expected to be maintained at near steady state for any set of growth conditions due to the self-regulation of organics into the system, which is a function of dissolution of organics from the non-aqueous phase into the aqueous phase. This is because even though the organics are minimally soluble, as the dissolved organics are utilized by microbes, more organics dissolve into the aqueous phase and the rate of solubility, not the degree of solubility maintains constant nutrient concentrations in the system. Nutrient utilization varies from the non-aqueous phase as a function of microbial activity in the subsurface. Therefore, this technology employs a self-regulating, non-aqueous organic nutrient source in the bulk phase as a nutrient reservoir.

FIG. 1 is a generic treatment system design. Treatment zone 1 may be an excavation, a tank or any volume into which contaminated water can be introduced and withdrawn. A bottom 3 provides a surface for precipitated metals to accumulate. Sides 5 and 7 (there must be complete containment in the form of any geometric figures) are penetrated by an inlet 9 for the introduction of water to be treated and an outlet 11 to discharge treated water. A top 13 encloses the zone and serves to exclude oxygen and other gasses, liquids and solids. If underground, top 13 also serves as thermal insulation. Penetrating the top 13 are a substrate addition port 15 through which nutrients such a biodegradable oil may be added and an optional opening 17 for removal of precipitated material from the bottom of the treatment zone.

Figure 2:
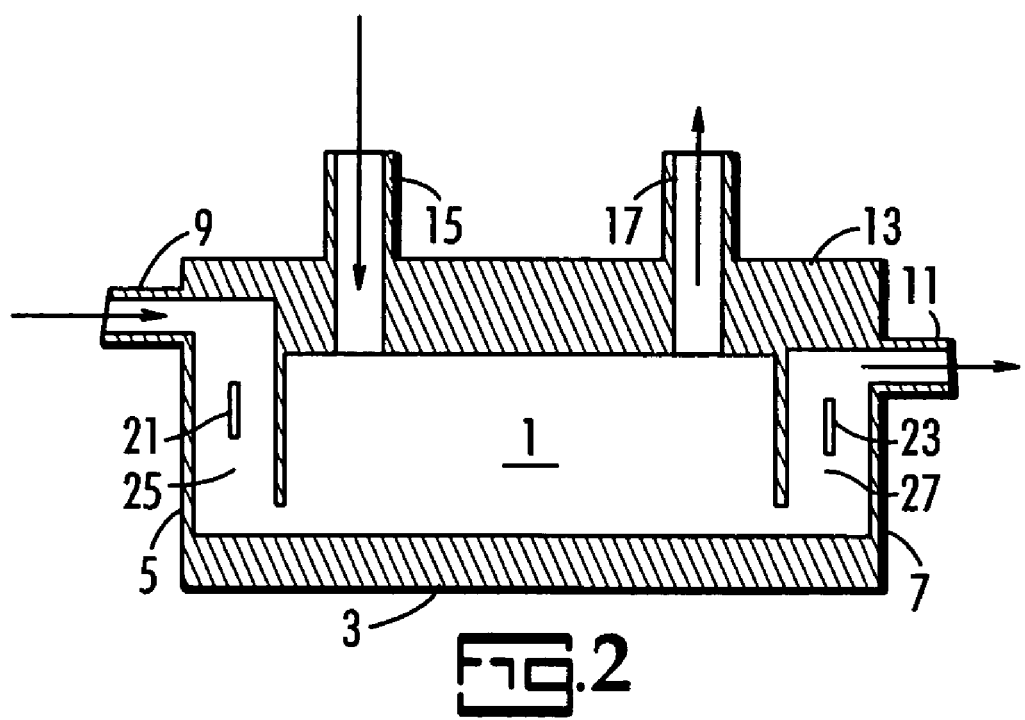
FIG. 2 is a schematic of a treatment system with containment devices.

FIG. 2 shows a modification of the system on FIG. 1 wherein baffles 21 and 23 create an anteroom 25 and a recessional room 27. The baffles quiet the treatment zone 1, retarding eddy currents and mixing.

Figure 3:
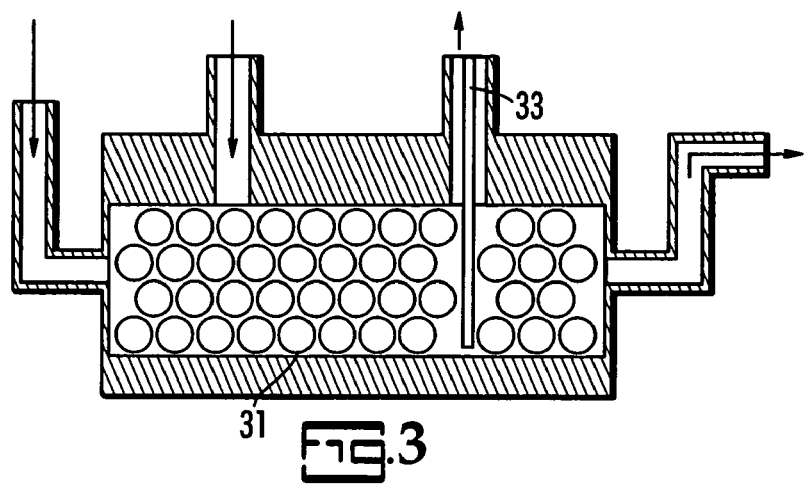
FIG. 3 is a schematic of a treatment system including biological support media.

FIG. 3 illustrates the use of biological support media 31. Biological support media are very high surface area, inert, porous materials to which bacteria attach. Such media facilitate the formation of biofilms of organisms and allow localized growth of facultative anaerobes in the early stages of the establishment of the treatment zone. The total organism count becomes higher and flushing of organisms is diminished because the bacteria are attached to the media as a lawn. Removal of precipitate is facilitated by the use of a snorkel pipe 33 which may be used to pump the bottom of the zone through a diaphragm sludge pump.

Figure 4:
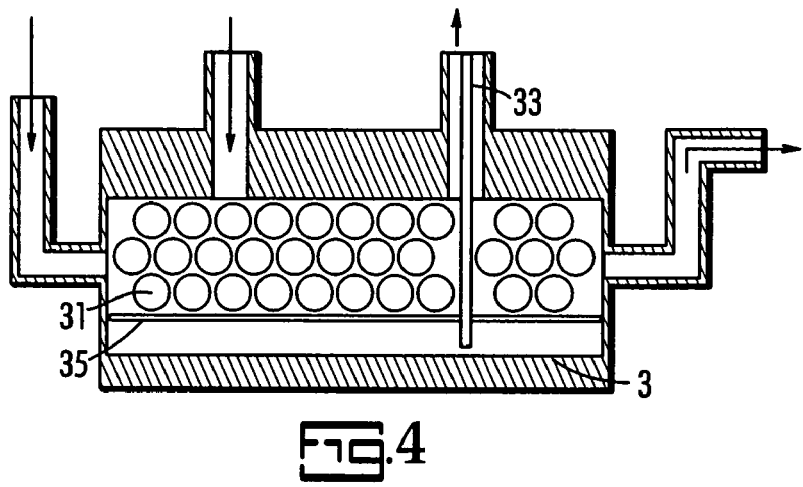
FIG. 4 is a schematic of the system of FIG. 3 modified to include a previous separator layer.

Separation of precipitate may be facilitated as shown in FIG. 4 where a previous separator 35 such as a screen may be used to isolate biological support media from the precipitate zone 3.

Figure 5:
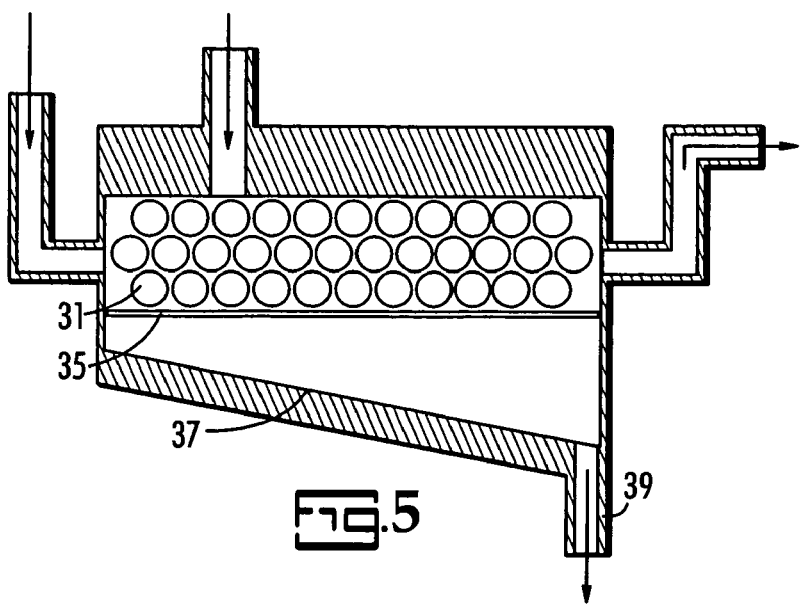
FIG. 5 is a schematic of an alternative treatment system with a particulate removal system beneath the treatment zone.

FIG. 5 illustrates an alternative approach to precipitate removal, especially useful in above-ground and shallow placement. The bottom floor 37 of precipitate zone 3 is tilted toward an end or the middle and precipitate removal port 37 draws from the low point of the floor 37.

The system of this invention has multiple advantages. Selection of indigenous organisms in the treatment area provides a low cost, constantly replenishing source of the desired bacteria. Location of the treatment zone downstream of the contamination source, together with suitable directing means, eliminates any need for pumping. Use of a biodegradable oil or wax mixture provides a continuous release of nutrients at a rate not controlled by any external device. The oil or wax is present as a separate phase and depletion is caused only by utilization, not by flushing as would occur with an emulsion. Solids in the system are limited to solids in the inputted water and precipitates formed in situ. Replenishment requires pumping more oil/wax into the additional port. Precipitate removal is by pump. A few visits to the site in the course of a year is the only maintenance required.

The proper operation of the system according to this invention requires proper analysis of the contaminants to be treated and the available on-site chemical and biological assets.

Firstly, water or soil (in many cases a mixed wet soil sample) is collected from the area to be treated. Typical analyses of the samples would include: 1) concentration of total suspended solids (TSS) and total dissolved solids (TDS); 2) temperature at the collection point and estimates of annual temperature swings in an average year; 3) specific conductivity; 4) current pH and annual fluctuations; 5) estimated annual minimum and maximum flow rates; 6) type and quantity of contaminants including a) heavy metals; b) metalloids; c) lanthanides and actinides; d) nitrates; e) nitrites, and f) chlorinated organics. $O_2$ content should be determined to ensure anaerobic conditions Next, an analysis should be made of the type and quantity of redox active oxides present which could serve as TEA's for growth and respiration for bacterial populations. Included would be: a) $SO_4^{-2}$; b) $NO_3^-$; c) $NO_2^-$; d) $O_2$, e) Mn(IV); f) Cr(VI); g) U (VI); h) Fe(III) and, i) chlorinated organics.

Another sampling should be made for mixed bacterial populations capable of performing desired biochemical reactions, including partially degrading selected carbon sources for use by anaerobic respiring bacteria which can utilize available, or provide carbon sources or their breakdown products, for anaerobic respiration. Bacterial population should be screened for ability to utilize contaminants and available inorganic oxides as TEA's including a) $SO_4$ reducers; b) $NO_3$ reducers; c) $NO_2$ reducers; d) $O_2$ reducers; e) Mn(IV) reducers; f) Cr(VI) reducers; g) U (VI) reducers; h) Fe(III) reducers; and, i) reducers of chlorinated organics.

It is important to determine the dominant reaction and thermodynamic rates when multiple TAE's are present and whether SRB's are directly or indirectly acting. It is advised strongly that the growth rates of mixed populations of organisms be evaluated and the final steady state growth rate including the presence of physiological inhibitors such as Ni, Al and Sn and process inhibitors including $O_2$, $NO_3$, Fe (III) and Mn (IV). When inhibitors are present it should be determined whether natural selection will cause an inhibitor resistant population to emerge or whether some type of scrubbing must be initiated to suppress the concentration of inhibitors (pre-treatment).

Once the conditions at the site have been determined, the operational parameters must be decided. Organic selection will consist of non-aqueous organics with a density <0.99 and consist of compounds from the list of biodegradable oils. Preferred are "edible oils" including canola oil, rapeseed oil, coconut oil, corn oil, cottonseed oil, olive oil, palm oil, palm kernel oil, peanut oil, safflower oil, soybean oil or sunflower oil, oils of animal origin such as beef oil and cod-liver oil and waxes such as tallow, canella oil, carnauba wax, beeswax, cotton wax, and palm tree wax. Purity is not critical and mixtures are suitable. All of the oils and waxes can be saponified (biodegradable) by various indigenous organisms to produce fatty acids of decreasing chain lengths when metabolized by a variety of indigenous organisms. The shorter chain fatty acids are the requisite electron donors to support the SRB's.

Selection (based on need) of inorganic micro nutrients, such as, Fe, W, Mo, Ni, S, K, P, N, etc, to be supplied at final concentrations of low ppm levels. The final determination of organic and inorganic nutrients will be based on;
  a. assessed need;
  b. desired biochemical reaction rates;
  c. local availability (especially shipping rates), and
  d, costs.

The final selection of bioreactor dimensions (especially volume) will be determined based on required residence time for contaminant removal to be complete and will include:
  a. flow rate of contaminant stream;
  b. rate of bacterial growth and contaminant removal;
  c. contaminant precipitation rates;
  d. volume of estimated solids accumulation.

Included in the determination of bioreactor of configuration will be based on;
  a. local geography and topography;
  b. desired location, position and size of an inlet;
  c. desired location, position and size of an outlet;
  d. optional compartment upstream of contaminant reaction zone for inhibitor (i.e. oxygen) depletion;
  e. optional compartment downstream of the contaminant mixing zone for BOD removal;
  f. material-substantially chemically inert, low cost, (locally available, if possible)

In addition to mine and coal pile runoff, the treatment system according to this invention may be applied to the remediation of other contaminants. Halogenated hydrocarbons have been treated by *Burkholderia* sp. (U.S. Pat. No. 6,613,558) and *Pseudomonas* sp. (U.S. Pat. No. 5,998,198). Cr(VI) has been bioremediated with conditioned endogenous anaerobes (U.S. Pat. No. 5,681,739). Nitrates are a problem in well water and are treatable by nitrate reducing bacteria. As a general rule, the system of this invention is applicable to any bioremediation process wherein a two phase system can be established with a nutrient source in an immiscible phase with the contaminated water.

INDUSTRIAL UTILITY

The contaminated water treatment system according to this invention is applicable to the resolution of waste-water from coal and other mines, coal yards, runoff from chemical operations, and any other semi-permanent or permanent point source.

The invention has been described in terms of preferred embodiments. Additions and modifications apparent to those with skill in the art are included in the spirit and scope of the invention.

The invention claimed is:

1. A method for the self regulating treatment of waste-water and contaminated groundwater comprising:
  a) characterizing the water to be treated;
  b) constructing a treatment zone having defined dimensions, top, bottom and an inlet, and outlet, means for introducing exogenous treatment agents and means for removing accumulated solids;
  c) establishing within said treatment zone an aqueous zone colonized with bacteria selected for the treatment of the water as characterized;
  d) allowing a mixed microbial population to become established in the presence of the water to be treated and a floating non-aqueous liquid electron donor;
  e) directing water to be treated to said inlet of said treatment zone;
  f) generating treated water in said treatment zone; and
  g) directing said treated water to an outlet.

2. A method according to claim 1 wherein said bacterial strains are selected from the group consisting of facultative anaerobes and obligate anaerobes and mixtures thereof.

3. A method according to claim 1 wherein the bacterial strains are sulfate reducing bacteria.

4. A method according to claim 1 wherein said bacterial strains are nitrate reducing bacteria.

5. A method according to claim 1 wherein said bacterial strains are Cr (VI) reducing anaerobes.

6. A method according to claim 1 wherein said bacterial strains are chlorinated solvent degrading bacteria.

7. A method according to claim 1 wherein said bacterial strains are indigenous to the local environment.

8. A method according to claim 1 wherein said bacterial strains are grown exogenous to the treatment situs.

9. A method according to claim 1 further comprising intermittent introduction of additional floating non-aqueous liquid electron donor.

10. A method according to claim 9 wherein said floating non-aqueous liquid electron donor is a vegetable oil selected from the group consisting of soybean oil, rapeseed oil, canola oil, corn oil, palm oil, castor oil, olive oil and peanut oil.

11. A method according to claim 9 wherein said floating non-aqueous liquid electron donor is mineral oil.

12. A method according to claim 1 further comprising intermittent removal of accumulated solids by pumping.

13. A method according to claim 1 further comprising establishing said bacterial colonization as a biofilm within said treatment zone.

14. A method according to claim 1, wherein the water to be treated is characterized by evaluating 1) concentration of total suspended solids (TSS) and total dissolved solids (TDS); 2) temperature at the collection point and estimates of annual temperature swings in an average year; 3) specific conductivity; 4) current pH and annual fluctuations; 5) estimated annual minimum and maximum flow rates; 6) type and quantity of contaminants including a) heavy metals; b) metalloids; c) lanthanides and actinides; d) nitrates; e) nitrites, and f) chlorinated organics.

15. A method according to claim 14 further characterized by evaluating the presence and concentration of partially degraded selected carbon sources for use by anaerobic respiring bacteria which can utilize same, or provide carbon sources or their breakdowns products, for anaerobic respiration, including contaminants and available a) $SO_4$ reducers; b) $NO_3$ reducers; c) $NO_2$ reducers; d) $O_2$ reducers; e) Mn(IV) reducers; f) Cr(VI) reducers; g) U (VI) reducers; h) Fe(III) reducers; and, i) reducers of chlorinated organics.

* * * * *